United States Patent
Ezell

(10) Patent No.: US 10,270,903 B2
(45) Date of Patent: Apr. 23, 2019

(54) FAILOVER ANNOUNCEMENTS

(71) Applicant: Avaya Inc., Santa Clara, CA (US)

(72) Inventor: Joel Ezell, Broomfield, CO (US)

(73) Assignee: Avaya Inc., Santa Clara, CA (US)

( * ) Notice: Subject to any disclaimer, the term of this patent is extended or adjusted under 35 U.S.C. 154(b) by 287 days.

(21) Appl. No.: 14/968,254

(22) Filed: Dec. 14, 2015

(65) Prior Publication Data
US 2017/0054843 A1    Feb. 23, 2017

Related U.S. Application Data

(60) Provisional application No. 62/208,197, filed on Aug. 21, 2015.

(51) Int. Cl.
| | |
|---|---|
| *H04L 29/06* | (2006.01) |
| *H04L 29/14* | (2006.01) |
| *H04M 3/428* | (2006.01) |
| *H04M 3/487* | (2006.01) |
| *H04M 3/533* | (2006.01) |

(52) U.S. Cl.
CPC ...... *H04M 3/4285* (2013.01); *H04L 65/1063* (2013.01); *H04L 65/4084* (2013.01); *H04L 65/80* (2013.01); *H04L 69/40* (2013.01); *H04M 3/4872* (2013.01); *H04M 3/53383* (2013.01)

(58) Field of Classification Search
CPC . H04L 65/1063; H04L 65/4084; H04L 65/80; H04L 69/40; H04M 3/53375; H04M 3/4872; H04M 3/4285; H04M 3/53383
See application file for complete search history.

(56) References Cited

U.S. PATENT DOCUMENTS

| | | | |
|---|---|---|---|
| 7,467,324 B1 | 12/2008 | Davda et al. | |
| 7,509,390 B1 * | 3/2009 | Raman | H04N 21/6125 709/213 |
| 2003/0051037 A1 * | 3/2003 | Sundaram | H04L 12/66 709/227 |
| 2004/0025186 A1 * | 2/2004 | Jennings | H04L 29/06 725/93 |
| 2006/0155814 A1 * | 7/2006 | Bennett | H04L 29/06027 709/207 |
| 2007/0011260 A1 * | 1/2007 | Chiu | H04L 29/06027 709/207 |
| 2007/0109960 A1 * | 5/2007 | Feng | H04L 29/06027 370/219 |
| 2008/0146859 A1 | 6/2008 | Rekoske et al. | |

(Continued)

*Primary Examiner* — Lisa Hashem
(74) *Attorney, Agent, or Firm* — Sheridan Ross P.C.

(57) ABSTRACT

To handle a failover condition, a media server receives a request, from a first application server, to stream a first media message in a media channel of a communication session. The first media message is streamed in the media channel of the communication session by the media server. Once the first media message has ended, a status message can be sent to the first application server to determine if the first application server has failed. If a response to the status message is not received (i.e., because the first application server has failed), the media server can stream a second media message during a period where a second application server is failing over for the first application server. If a response to the status message is received, the second media message is not streamed.

20 Claims, 4 Drawing Sheets

(56) References Cited

U.S. PATENT DOCUMENTS

| | | | |
|---|---|---|---|
| 2010/0138531 A1* | 6/2010 | Kashyap | H04L 65/608 |
| | | | 709/224 |
| 2011/0252118 A1* | 10/2011 | Pantos | G06F 17/30053 |
| | | | 709/219 |
| 2012/0072608 A1* | 3/2012 | Peters | H04L 65/4084 |
| | | | 709/231 |
| 2012/0124227 A1* | 5/2012 | Al-Khowaiter | H04L 65/1046 |
| | | | 709/228 |
| 2014/0325258 A1 | 10/2014 | Mendiratta et al. | |
| 2015/0178137 A1* | 6/2015 | Gordon | H04L 67/1008 |
| | | | 709/226 |
| 2015/0382250 A1* | 12/2015 | Speks | H04L 65/1016 |
| | | | 455/436 |
| 2016/0249079 A1* | 8/2016 | Malone | H04N 21/234309 |
| 2016/0301724 A1* | 10/2016 | Kodaypak | H04L 43/0817 |
| 2018/0048758 A1* | 2/2018 | Lum | H04M 3/5175 |

\* cited by examiner

FAILOVER ANNOUNCEMENTS

CROSS REFERENCE TO RELATED APPLICATIONS

This application claims the benefit under 35 U.S.C. § 119(e) of U.S. Provisional Application No. 62/208,197, filed Aug. 21, 2015, entitled "Provisional Announcement," the entire disclosure of which is incorporated herein by reference.

TECHNICAL FIELD

The systems and methods disclosed herein relate to communication systems and in particular providing media streams for communication systems during failover conditions.

BACKGROUND

Announcements have been used for decades to communicate information to users waiting in a contact center queue. Customers typically expect to hear music on hold and estimated wait time information. When there is a workflow in progress (e.g., a series of messages to be played), there are times in the workflow that the music on hold message is interrupted to play a short announcement. Once the short announcement is completed, an event message may come back from a media server to say that the announcement is complete. The workflow then resumes based on the receipt of the event message. For example, interrupting music on hold while the user is on hold in the contact center queue to give an estimated wait time for the call to be answered is a common event. When the workflow is interrupted, the music temporarily stops, the announcement is played, and then the music resumes until an agent accepts the work item.

If a primary server controlling the call fails during the short interrupt announcement, the event message from the media server saying that the announcement is complete may get lost. Rather than hearing the music resume, the customer may hear silence. If a customer hears silence for too long before a failover completes and a new application server takes over and resumes the workflow, the customer may hang up.

BRIEF SUMMARY

Systems and methods are provided that can manage streaming of media messages during a failover period. To handle a failover condition, a media server receives a request, from a first application server, to stream a first media message in a media channel of a communication session. The first media message is streamed in the media channel of the communication session by the media server. Once the first media message has ended, a status message can be sent to the first application server to determine if the first application server has failed. If a response to the status message is not received (i.e., because the first application server has failed), the media server can stream a second media message during a period where a second application server is failing over for the first application server. If a response to the status message is received, the second media message is not streamed.

DETAILED DESCRIPTION

Figure 1:
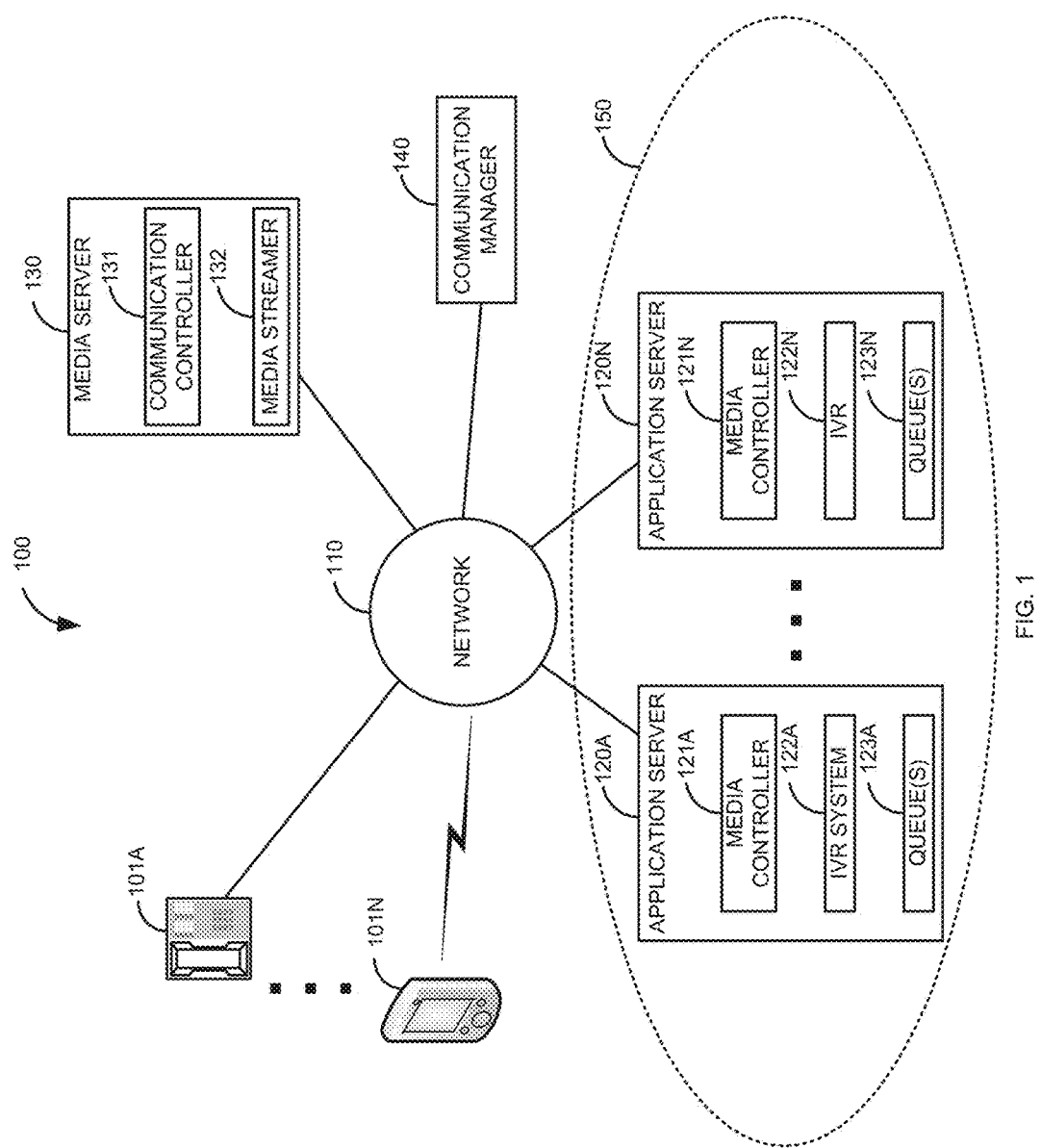
FIG. 1 is a block diagram of a first illustrative system for providing failover media messages.

FIG. 1 is a block diagram of a first illustrative system 100 for providing failover media messages. The first illustrative system 100 comprises communication devices 101A-101N, a network 110, application servers 120A-120N, a media server 130, and a communication manager 140.

The communication devices 101A-101N can be or may include any device that can communicate on the network 110, such as a Personal Computer (PC), a telephone, a video system, a cellular telephone, a Personal Digital Assistant (PDA), a tablet device, a notebook device, a smart phone, and the like. As shown in FIG. 1, any number of communication devices 101A-101N may be connected to the network 110, including only a single communication device 101.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), H.323, video protocols, Integrated Services Digital Network (ISDN), Hyper Text Transport Protocol (HTTP), and/or the like. Thus, the network 110 is an electronic communication network configured to carry messages via packets and/or circuit switched communications.

The application servers 120A-120N can be any hardware that executes one or more applications that uses a media server 130 to provide one or more media streams for a communication session. In FIG. 1, the application servers 120A-120N represent a typical contact/call center. However, the application servers 120A-120N are not limited to a contact center. For example, the application servers 120A-120N may be an Interactive Voice Response (IVR system 122), a voice mail system, and/or the like. The application servers 120A-120N may also comprise the communication manager 140.

The application servers 120A-120N are a cluster of servers 150 that allows for one application server 120 to fail over communication sessions (e.g. voice calls) if another application server 120 fails. The application servers 120A-120N, in conjunction with the communication manager 140 allow for one application server 120 to failover when one application server fails 120. Failover of one application server 120 to another can be accomplished in various ways that are know in the art, such as where a second application server 120 shares a state of all calls. Alternatively, an application server 120 can fail over any new calls once an application server 120 has failed.

The application servers 120A-120N further comprise media controllers 121A-121N, IVR systems 122A-122N, and queue(s) 123A-123N. The media controllers 121A-121N can be any hardware/software that can control and/or manage different media messages that are played by the media server 130. For example, the media messages may be for music on hold, a call wait time announcement, an announcement for the number of callers ahead in a queue 123, an outage message, a menu in an IVR system 122 script (e.g., a Voice Extended Markup Language (VXML) script), a work flow of media messages for a contact center, a voice mail message, and/or the like.

The IVR systems 122A-122N can be any hardware coupled with software that can provide voice response messages to a caller. The IVR systems 122A-122N can interact with a user via voice commands, Dual Tone Multi-Frequency (DTMF) tones, and media messages.

The queues 123A-123N can be contact center queues 123 that are used to hold calls, such as voice or video calls into a contact center. For example, callers may be placed on hold in the queue 123 until a contact center agent services the calls.

The application servers 120A-120N may comprise other elements (not shown) that are used where media messages are streamed. For example, a contact center (application server 120) may be a queue-less contact center that uses a call pool where voice and video calls are held until the calls are serviced by a contact center agent.

The media server 130 can be or may include any hardware server coupled with software that can stream media messages. The media messages may be voice messages, video messages, multimedia messages, virtual reality messages, and/or the like. The media server 130 further comprises a communication controller 131 and a media streamer 132.

The communication controller 131 can be or may include any hardware/software that can be used to establish a media channel with a communication device 101. The media streamer 132 can be or may include any hardware/software that can control media messages that are streamed to a communication device 101.

The communication manager 140 can be or may include any hardware coupled with software that can manage communication sessions for the application servers 120A-120N. The communication manager 140 can determine which of the application servers 120A-120N will handle communication sessions. For example, to perform load balancing between the application servers 120A-120N. The communication manager 140 may route calls based to different application servers 120 based on which application servers 120 have failed, which application servers 120 are primary application servers 120, which ones are secondary application servers 120, and/or the like.

Figure 2:
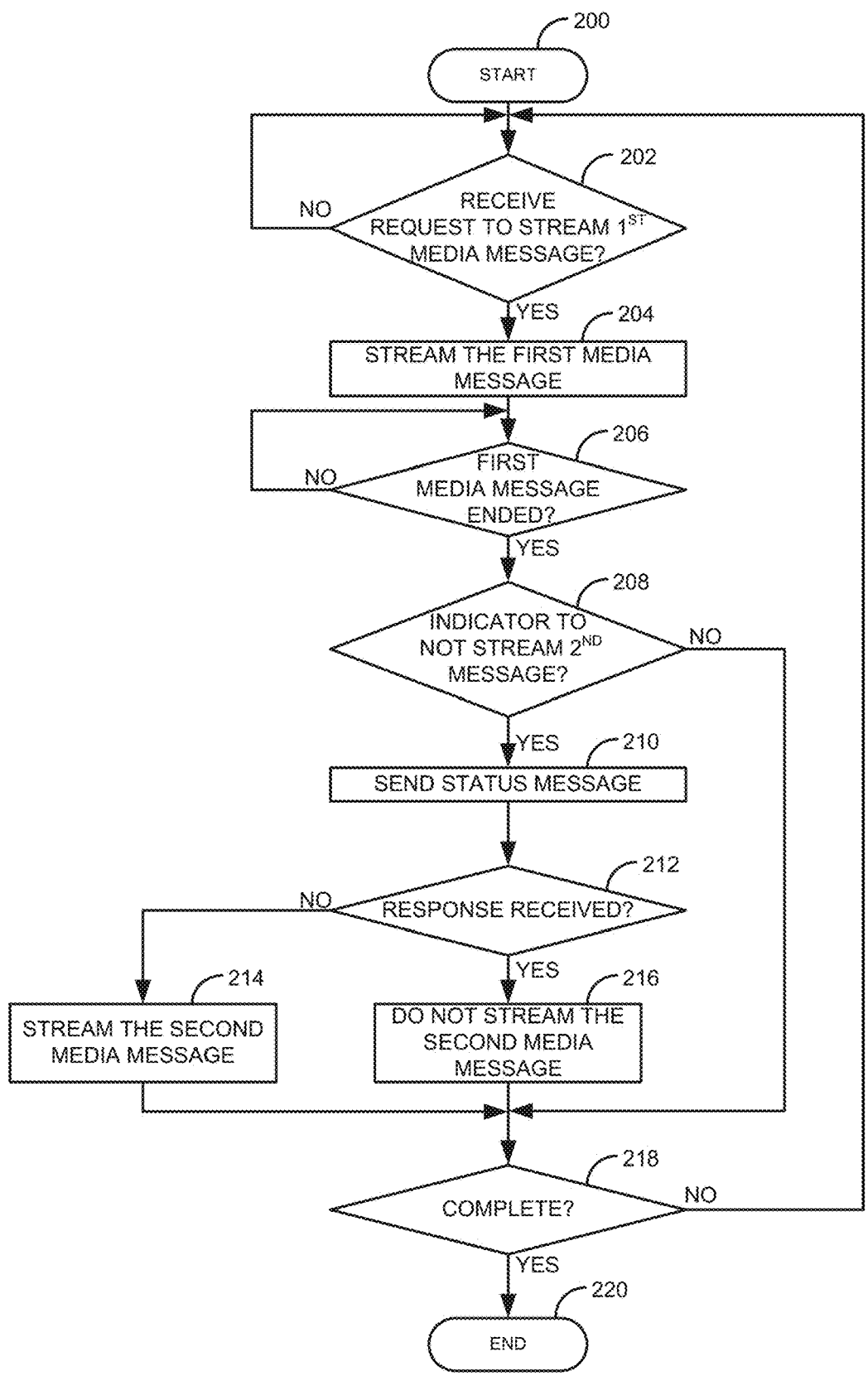
FIG. 2 is a flow diagram of a process for providing failover media messages.
Figure 3:
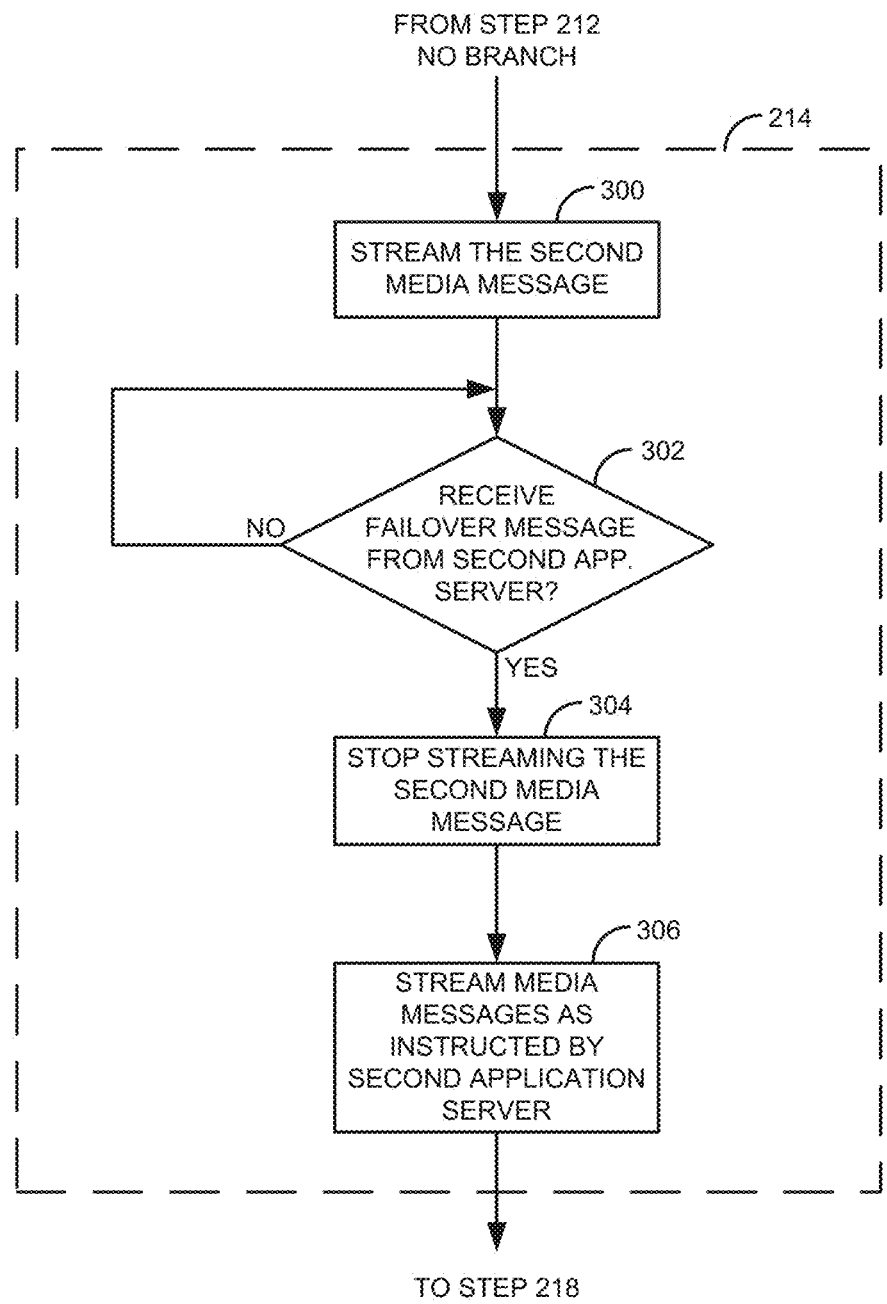
FIG. 3 is a flow diagram of a process for failing over to a second application server.
Figure 4:
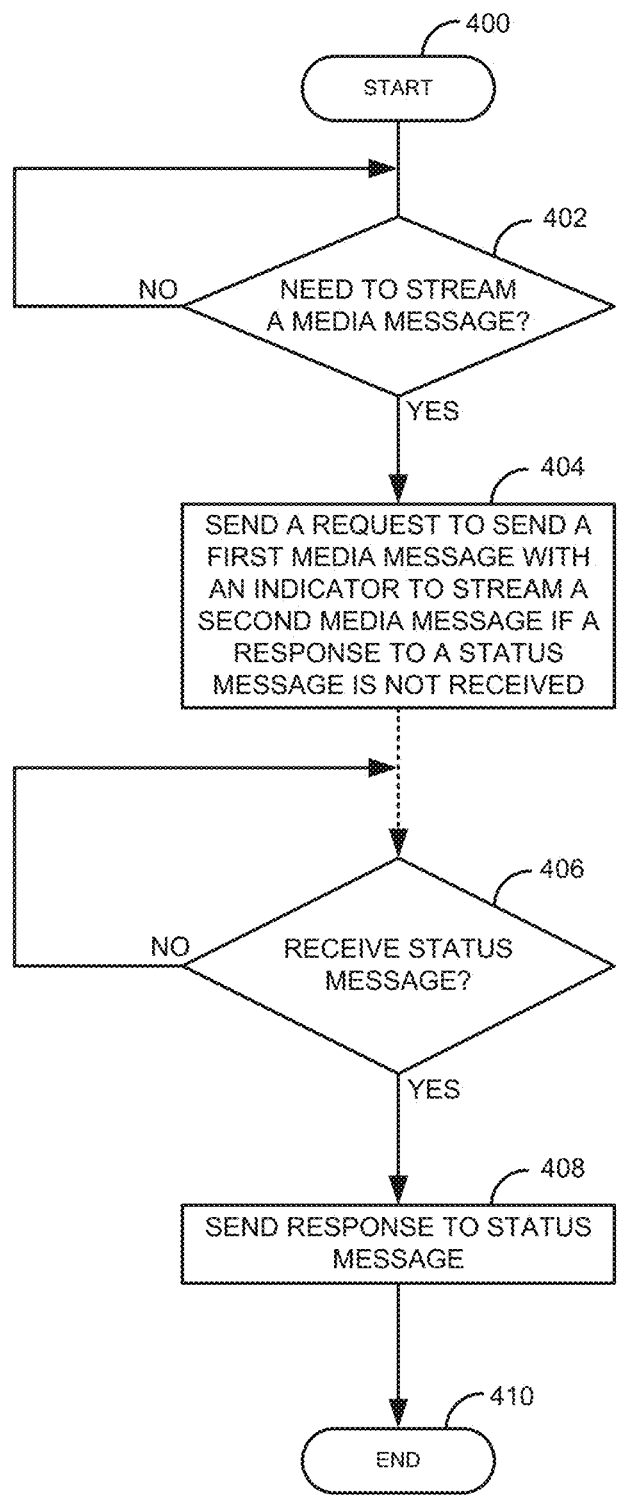
FIG. 4 is a flow diagram of a process of an application server requesting media streams.

FIG. 2 is a flow diagram of a process for providing failover media messages. Illustratively, the communication devices 101A-101N, the application servers 120A-120N, the media controllers 121A-121N, the IVR systems 122A-122N, the queue(s) 123A-123N, the media server 130, the communication controller 131, the media streamer 132, and the communication manager 140 are stored-program-controlled entities, such as a computer or processor, which performs the method of FIGS. 2-4 and the processes described herein by executing program instructions stored in a computer readable storage medium, such as a memory or disk. Although the methods described in FIGS. 2-4 are shown in a specific order, one of skill in the art would recognize that the steps in FIGS. 2-4 may be implemented in different orders and/or be implemented in a multi-threaded environment. Moreover, various steps may be omitted or added based on implementation.

The process starts in step 200. The communication controller 131 determines if a request to stream a media message has been received in step 202. If a request to stream a first media message has not been received in step 202, the process of step 202 repeats.

Otherwise, if a request to stream a media message has been received by the communication controller 131 in step 202, the media streamer 132 streams the first media message (e.g., music on hold) in step 204. The media streamer 132 determines, in step 206, if the first media message has ended. If the first media message has not ended in step 206, the process of step 206 repeats.

Otherwise, if the first media message has ended in step 206, the media streamer 132 may optionally determine, in step 208, if the request to steam the media message (step 202) has an indicator to stream or not stream the second media message (discussed below in steps 210-212). The indicator allows the media controller 121 to determine specific situations where a second message is streamed in case of a failover condition. If the request to stream the first media message has an indicator to not stream the second message in step 208, the process goes to step 218. The process of step 208 may be administered by an administrator.

Otherwise, if the indicator indicates to stream a second message in step 208 (or where there is no indicator in the request to receive the first media message), the communication controller 131 sends a status message to the media controller 121 in step 210. If a response to the status message is received in step 212, the media streamer 132 does not stream a second media message in step 216. Otherwise, if the response to the status message is not received in step 212 (e.g., after a specific time period), the media streamer 132 streams a second media message in step 214 because it is assumed that the application server 120 has failed or cannot be accessed (e.g., because of a network failure). The process of step 212, 214, and 216 may be controlled based on an administrative configuration.

The communication controller 131 determines if the process is complete in step 218. If the process is not complete in step 218, the process goes back to step 202. Otherwise, if the process is complete in step 218, the process ends in step 220.

To illustrate, consider the following example. Assume that the application server 120A is a contact center that has received a voice call from the communication device 101A. The application server 120A puts the call in the contact center queue 123A. When the call is placed on hold, the media controller 121 sends the request to the communication controller 131 to play music wait treatment (step 202) in the media stream of the communication session with the communication device 101A. The request does not have the indicator. The media streamer 132 streams the music on hold media message to the communication device 101A (step 204). The music on hold media message ends (step 206). Since there is no indicator in the request to stream the second message (i.e., no step 208), the communication controller 131 sends the status message to the application server 120A (step 210). In this example, the application server 120A has failed and no response message is received from the application server 120A (step 212). The media streamer 132 starts streaming the second media message (step 214). The second media message is played during the time period where the application server 120N is failing over to reestablish the communication sessions that are on the failed application server 120A. For example, it may take several minutes to fail over a large contact center with thousands of active calls.

In one embodiment, the media streamer 132 may wait for a defined time period (e.g., 2 seconds) before playing the second message after the first message ends. This allows a transition period between the first media message and the second media message. Alternatively, the second media message may have a defined period of silence at the beginning of the second media message.

FIG. 3 is a flow diagram of a process for failing over to a second application server 120. The process of FIG. 3 is an expanded view of step 214 in FIG. 2.

After determining that a response to the status message was not received in step 212, the media streamer 132 streams the second media message. The communication controller 131 determines in step 302 if a failover message has been received from the second application server 120N. If a failover message has not been received from the application server 120N in step 302, the process of step 302 repeats.

The failover message may be implemented using different protocols, such as Session Initiation Protocol (SIP), HTTP, H.323, WebRTC, and/or the like. For example, the failover message from the second application can be implemented using a Session Initiation Protocol (SIP) INVITE with replaces header message to transfer a control channel of communication session to the second application server 120. The SIP INVITE with replaces header has the new address of the second application server 120N.

Otherwise, if the failover message has been received from the application server 120N in step 302, the media streamer 132 stops streaming the second media message in step 304. When the failover message is sent in step 302, the application server 120N re-executes the last step that was invoked in the application server 120A (the application server 120A that failed). If this step was to stream a different media message, the failover message will instruct the media streamer 132 to stop the second media message in step 304 and stream the different media message in step 306. The media message that is streamed in step 306 may be the first media message (the media message streamed in step 204), the second media message, or a different media message.

To illustrate, consider the following example. During the time the first application server 120A has failed, the media streamer 132 streams the second message in step 300. The communication controller 131 receives a failover message from the application server 120N in step 302. The media streamer 132 stops streaming the second media message (e.g., a second music on hold message) in step 304. The application server 120N sends a message that instructs the media streamer 132 to stream a media message that indicates that the voice call is being transferred to an agent in step 306.

FIG. 4 is a flow diagram of a process of an application server 120 requesting media streams. The process of FIG. 4 is for the process of FIGS. 2-3 from the media controller's 121 perspective.

The process starts in step 400. The media controller 121 determines, in step 402, if there is a need to have media message streamed in a communication session. If there is not a need to have a media message streamed in a communication session in step 402, the process of step 402 repeats.

Otherwise, if there is a need to stream a media message in step 402, the media controller 121 sends a request to the media server 130 in step 404. The request is for the media server 130 to stream a first media message. The message may include the indicator to stream the second media message if a response to a status message is not received. The request sent in step 404 is the request received in step 202.

At this point, the media controller 121 waits, in step 406, to receive a status message that is sent in step 210 by the communication controller 131. If a status message is not received in step 406, the process of step 406 repeats. If a status message is received in step 406, the media controller 121 sends, in step 408, a response to the status message in step 408. The process of steps 406-408 may be implemented in a multi-tasking operating system where a separate thread or daemon is created to wait to receive the status message.

The above processes are described with one embodiment being SIP. However, the above processes are not limited to SIP. For example, a HTTP media server control protocol may be used.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the disclosure. Those skilled in the art will appreciate that the features described above can be combined in various ways to form multiple variations of the disclosure. As a result, the disclosure is not limited to the specific embodiments described above, but only by the following claims and their equivalents.

Furthermore, while the exemplary aspects, embodiments, and/or configurations illustrated herein show the various components of the system collocated, certain components of the system can be located remotely, at distant portions of a distributed network 110, such as a LAN and/or the Internet, or within a dedicated system. Thus, it should be appreciated, that the components of the system can be combined in to one or more devices, or collocated on a particular node of a distributed network 110, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server 130, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed.

Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "module" as used herein refers to any known or later developed hardware, software, firmware, artificial intelligence, fuzzy logic, or combination of hardware and software that is capable of performing the functionality associated with that element.

The terms "determine", "calculate" and "compute," and variations thereof, as used herein, are used interchangeably and include any type of methodology, process, mathematical operation or technique.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

What is claimed is:

1. A media server comprising:
    a microprocessor;
    a computer readable medium, coupled with the microprocessor, comprising microprocessor readable and executable instructions for a communication controller and a media streamer;
    the microprocessor executing the communication controller: receives a request, from a first application server, to stream a first media message in a media channel of a communication session, sends a status message to the first application server in response to determining that the first media message has ended, and determines if a response to the status message has been received from the first application server; and
    the microprocessor executing the media streamer: streams the first media message in the media channel of the communication session, determines that the first media message has ended, streams a second media message in response to determining that the response to the status message has not been received from the first application server, and does not stream the second media message in response to determining that the response to the status message has been received from the first application server.

2. The media server of claim 1, wherein the request to stream the first media message in the media channel of the communication session has an indicator to stream the second media message after the first media message if the response to the status message is not received.

3. The media server of claim 1, wherein the response to the status message is not received because the first application server has failed.

4. The media server of claim 3, wherein the second media message is streamed during a time period that the first application server has failed.

5. The media server of claim 4, wherein:
    the communication controller receives a message from a second application server indicating that the second application server has taken over for the first application server; and
    the media streamer stops sending the second media message in response to receiving the message from the second application server indicating that the second application server has taken over for the first application server.

6. The media server of claim 5, wherein the message from the second application server indicating that the second application server has taken over for the first application server is a Session Initiation Protocol (SIP) INVITE with replaces header message, wherein the SIP INVITE with replaces header message transfers a control channel of communication session to the second application server.

7. The media server of claim 5, wherein the message from the second application server indicating that the second application server has taken over for the first application server indicates to stream the first media message or a third media message.

8. The media server of claim 1, wherein the response to the status message indicates that the first application server has not failed.

9. The media server of claim 1, wherein the media streamer delays streaming of the second message based on a defined period of time in response to determining that the response to the status message has not been received from the first application server.

10. The media server of claim 1, wherein the second message has a defined period of silence at the beginning of the second message.

11. A method comprising:
receiving, by a processor, a request from a first application server to stream a first media message in a media channel of a communication session;
streaming, by the processor, the first media message in the media channel of the communication session;
determining, by the processor, that the first media message has ended;
in response to determining that the first media message has ended, sending, by the processor, a status message to the first application server;
determining, by the processor, if a response to the status message has been received from the first application server;
in response to determining that the response to the status message has not been received from the first application server, the processor streaming a second media message; and
in response to determining that the response to the status message has been received from the first application server, the processor not streaming the second media message.

12. The method of claim 11, wherein the request to stream the first media message in the media channel of the communication session has an indicator to stream the second media message after the first media message if the response to the status message is not received.

13. The method of claim 11, wherein the response to the status message is not received because the first application server has failed.

14. The method of claim 13, wherein the second media message is streamed during a time period that the first application server has failed.

15. The method of claim 14, further comprising:
receiving a message from a second application server indicating that the second application server has taken over for the first application server; and
in response to receiving the message from the second application server indicating that the second application server has taken over for the first application server, stop sending the second media message.

16. The method of claim 15, wherein the message from the second application server indicating that the second application server has taken over for the first application server is a Session Initiation Protocol (SIP) INVITE with replaces header message, wherein the SIP INVITE with replaces header message transfers a control channel of communication session to the second application server.

17. The method of claim 15, wherein the message from the second application server indicating that the second application server has taken over for the first application server indicates to stream the first media message or a third media message.

18. The method of claim 11, wherein the response to the status message indicates that the first application server has not failed.

19. The method of claim 11, further comprising:
in response to determining that the response to the status message has not been received from the first application server, delaying streaming of the second message based on a defined period of time.

20. A method comprising:
sending, by a processor, a request to a media server to stream a first media message in a media channel of a communication session, wherein the request to stream the first media message in the media channel of the communication session has an indicator to stream a second media message after the first media message if a response to a status message is not received, wherein the first media message is a different media message than the second media message;
receiving, by the processor, the status message from the media server; and
in response to receiving the status message from the media server, responding, by the processor, to the status message from the media server.

* * * * *